US008572645B2

(12) United States Patent
Kim et al.

(10) Patent No.: US 8,572,645 B2
(45) Date of Patent: Oct. 29, 2013

(54) IPTV AND METHOD FOR CONTROLLING EMERGENCY ALERT SYSTEM WIDGET IN IPTV

(75) Inventors: Kyung Ho Kim, Seoul (KR); Jin Pil Kim, Seoul (KR); Joon Hui Lee, Seoul (KR); Jong Yeul Suh, Seoul (KR); Hyeong Ho Son, Seoul (KR)

(73) Assignee: LG Electronics Inc., Seoul (KR)

( * ) Notice: Subject to any disclaimer, the term of this patent is extended or adjusted under 35 U.S.C. 154(b) by 520 days.

(21) Appl. No.: 12/656,103

(22) Filed: Jan. 15, 2010

(65) Prior Publication Data

US 2010/0186029 A1 Jul. 22, 2010

Related U.S. Application Data

(60) Provisional application No. 61/145,571, filed on Jan. 18, 2009.

(51) Int. Cl.

| | |
|---|---|
| ***H04N 7/10*** | (2006.01) |
| ***H04N 7/025*** | (2006.01) |
| ***H04N 5/445*** | (2011.01) |
| ***G06F 3/00*** | (2006.01) |
| ***G06F 13/00*** | (2006.01) |

(52) U.S. Cl.
USPC .................. 725/33; 725/32; 725/34; 725/35; 725/36; 725/38; 725/40; 725/41; 725/42; 725/43; 725/47; 725/49; 725/50; 725/51

(58) Field of Classification Search
USPC ............................ 725/33, 38, 40–43, 47–51
See application file for complete search history.

(56) References Cited

U.S. PATENT DOCUMENTS

| | | | | |
|---|---|---|---|---|
| 7,308,697 | B1 * | 12/2007 | Jerding et al. | 725/34 |
| 2002/0124252 | A1 * | 9/2002 | Schaefer et al. | 725/33 |
| 2007/0061724 | A1 * | 3/2007 | Slothouber et al. | 715/716 |
| 2007/0107009 | A1 * | 5/2007 | Kim | 725/33 |
| 2007/0136743 | A1 | 6/2007 | Hasek et al. | |
| 2009/0160635 | A1 * | 6/2009 | Bopardikar | 340/531 |

FOREIGN PATENT DOCUMENTS

| | | |
|---|---|---|
| KR | 10-2006-0029985 | 4/2006 |
| KR | 10-2006-0046886 | 5/2006 |
| KR | 10-2006-0091862 | 8/2006 |

* cited by examiner

*Primary Examiner* — Pankaj Kumar
*Assistant Examiner* — Alazar Tilahun
(74) *Attorney, Agent, or Firm* — McKenna Long & Aldridge LLP

(57) ABSTRACT

A digital broadcast receiver and a method of controlling data for an emergency alert system (EAS) in a digital broadcast receiver are provided. The method includes receiving a digital broadcast signal including an emergency alert table including a uniform resource identifier (URI) descriptor, detecting a URI address included in the URI descriptor, accessing the URI address, receiving additional emergency alert information from the URI address, and performing control to display the additional emergency alert information on a screen of the digital broadcast receiver.

10 Claims, 15 Drawing Sheets

FIG. 10

| Syntax | Bits | Description |
|---|---|---|
| cable_emergency_alert() { | 8 | |
| table ID | 1 | |
| section_syntax_indicator | 1 | |
| zero | 2 | |
| reserved | 12 | |
| table_id_extension | 16 | |
| reserved | 2 | |
| sequence_number | 5 | |
| ⋮ | ⋮ | ⋮ |
| uri_descriptor | | (A) |
| description_length | 10 | |
| for( i=0; i < N; i++ ) { | | |
| descriptor() | var | Optional (B) |
| } | | |
| CRC_32 | 32 | |
| } | | |

FIG. 11

| descriptor_tag | Meaning |
|---|---|
| 0x00 | In-Band Detail Channel Descriptor |
| 0x01 | In-Band Exception Channel Descriptor |
| 0x02 | Audio File Descriptor |
| 0x03 | Uniform Resource Identifier(URI) Descriptor |
| 0x04 ~ 0xAC | Reserved for future use |
| 0xAD | ATSC Private Information Descriptor |
| 0xAE ~ 0xBF | Reserved for future use |
| 0xC0 ~ 0xFF | User Private |

FIG. 12

| Syntax | Bits | Data Type | Description |
|---|---|---|---|
| uri_descriptor() { | | | |
| descriptor_tag | 8 | 0x03 | Constant Value |
| descriptor_length | 8 | uimsbf | Maximum 256 bytes |
| uri | var | uimsbf | http://www.weather.com/access/emergency?alert =blizzard&area=02135 |
| } | | | |

FIG. 13

| Syntax | Bits | Data Type | Description |
|---|---|---|---|
| uri_description_length | 15 | uimsbf | |
| for(j = 0; j < M; j++) { | | | |
| uri_descriptor() { | | | |
| descriptor_tag | 8 | 0x03 | Constant Value |
| descriptor_length | 8 | uimsbf | Maximum 256 bytes |
| uri | var | uimsbf | http://www.weather.com/access/emergency?alert=blizzard&area=02135 |
| } | | | |
| } | | | |

FIG. 15

| Category | EAS Extension API | Description |
|---|---|---|
| EAS Object | LoadWidget | Makes EAS widget application executable |
| | Initialize | Initializes an EAS widget object when the EAS widget application is executed. |
| | ReInitialize | Reinitializes an EAS widget application. Here, memory and variables are initialized. |
| | GetHostIpAddress | Gets the IP address of an IPTV receiver and determine a region where the receiver is located. |
| | NotifSocketEASMessage | Upon receiving notification from 3rd party notification handler, this function is activated in the IPTV receiver and processes the EAS message |
| | DisplayEASWidgetOnTop | Allows the the EAS widget application to be viewed in a layer above other widget applications |
| | ShowAlertMessage | Displays all information items received or collected in an EAS message format on the screen |
| | ConnectEASServer | When the EAS widget application excecutes this function, a widget framework processes this function's request with higher priority, ignoring other socket requests. |
| OEM Extension APIs (IPTV Host) | RegisterNotifSocketCallback | Registers a callback of the EAS widget application in the 3rd notification handler in the IPTV receiver |
| | GetHostProfile | Provides XML or text hardware information of the IPTV receiver and provisioning information set by the service provider to the EAS widget application |
| | ChangeEASChannel | Moves to an EAS channel set in the EAS message. This function prevents the user from arbitrarily moving to another channel. |
| | SetHostControlPolicy | Changes authority setting to enable of the IPTV receiver to operate through the EAS widget application when there is a need to control the operation of the receiver according to the EAS message. This may limit some remote controller operations by the user. For example, conditional policies associated with a condition that channel change from the EAS channel to another channel be prohibited while volume control is allowed and a condition that the EAS channel be viewed only through a PIP channel while channel change is allowed can be adjusted according to parameters. |
| | SetEASVolume | Sets volume of an EAS channel set in the EAS message. Here, the condition of allowing the user to arbitrarily control volume may vary according to a SetHostControlPolicy parameter. |
| | DisapearAllWidgetsOnScreen | Causes all widget applications on the screen to be hidden behind the EAS widget application at request of the EAS widget application or reduces the order of other windows so that the EAS widget application is well viewed. Alternatively, this function causes all widget applications not to be viewed |

IPTV AND METHOD FOR CONTROLLING EMERGENCY ALERT SYSTEM WIDGET IN IPTV

This application claims the benefit of U.S. Provisional Patent Application No. 61/145,571, filed on Jan. 18, 2009, which is hereby incorporated by reference as if fully set forth herein.

BACKGROUND OF THE INVENTION

1. Field of the Invention

The present invention relates to an Internet Protocol Television (IPTV), and more particularly, to an IPTV that controls an Emergency Alert System (EAS) widget.

2. Discussion of the Related Art

A Emergency Alert System (EAS) provides notification messages to the public in cases such as when a national emergency has occurred or when a natural disaster is expected. Detailed protocols for implementing the EAS have not been defined for an Internet Protocol Television (IPTV) having bidirectionality, an interactive (or bidirectional) TV, and the like.

SUMMARY OF THE INVENTION

An object of the present invention devised to solve the problem lies on providing a method for executing an EAS widget application.

Another object of the present invention devised to solve the problem lies on defining a more detailed protocol for driving an EAS widget application on an IPTV or an interactive cable TV.

A further object of the present invention devised to solve the problem lies on providing a more efficient method for preventing delay of an EAS message.

In one embodiment of the present invention to achieve the above objects, provided herein is a method of controlling data for an emergency alert system (EAS) in a digital broadcast receiver, the method including receiving a digital broadcast signal including an emergency alert table including a uniform resource identifier (URI) descriptor, detecting a URI address included in the URI descriptor, accessing the URI address, receiving additional emergency alert information from the URI address, and performing control to display the additional emergency alert information on a screen of the digital broadcast receiver.

In another embodiment of the present invention, provided herein is a method of controlling an emergency alert system (EAS) widget application in an IPTV, the method including executing the EAS widget application, directly receiving additional emergency alert information from an EAS server connected to an Internet protocol (IP) network, and performing control to display the additional emergency alert information on the EAS widget application.

In a further another embodiment of the present invention, provided herein is a digital broadcast receiver for controlling multiple events, the digital broadcast receiver including a browser configured to render and control a user interface delivered by a server, a first handler configured to forward a first event to the browser for processing, a second handler configured to send and receive a second event during active interaction via server-supplied scripts, a third handler configured to process a third event and invoke the browser to fetch and render UI content using a URL contained within the third event, and a prioritized event scheduler configured to connect the first handler, the second handler, the third handler, and the browser, wherein the prioritized event scheduler further reorders sequences based on priorities which the first event, second event and third event is to be transmitted to the browser.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 10 illustrates an emergency alert table newly defined according to an embodiment of the present invention.

FIG. 11 illustrates identification values of a descriptor tag added to the emergency alert table of FIG. 10.

FIG. 12 illustrates an example of the URI_Descriptor added to the emergency alert table of FIG. 10.

FIG. 13 illustrates another example of the URI_Descriptor added to the emergency alert table of FIG. 10.

FIG. 15 illustrates a definition of an EAS extension Application Programming Interface (API) used in a procedure for executing an EAS widget application according to an embodiment of the present invention.

DETAILED DESCRIPTION OF THE INVENTION

Figure 1:
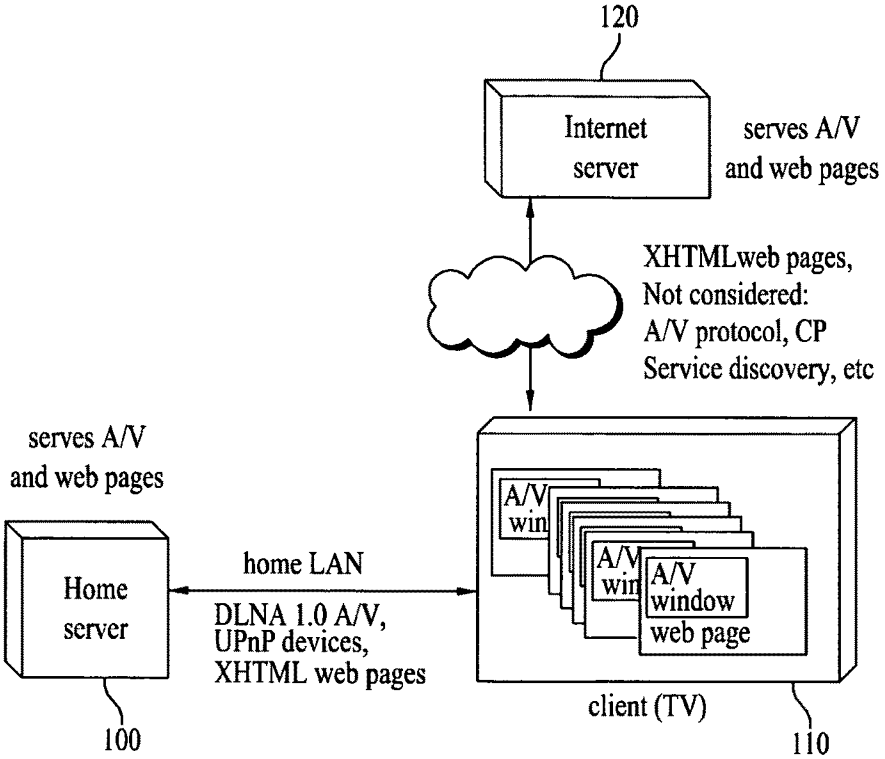
FIG. 1 illustrates a client that can access a server over the Internet.

Although embodiments of the present invention will now be described with reference to the accompanying drawings and illustrations or descriptions in the drawings, the present invention is not limited to the embodiments.

Although most terms of elements in the present invention have been selected from general ones widely used in the art taking into consideration their functions in the invention, the terms may be changed depending on the intention or convention of those skilled in the art or the introduction of new technology. Some terms have been arbitrarily selected by the applicant and their meanings are explained in detail in the following description as needed. Thus, the definitions of the terms used in the invention should be determined based on the whole content of this specification together with the intended meanings of the terms rather than their simple names or meanings.

FIG. 1 illustrates a client that can access a server over the Internet.

A home server 100 shown in FIG. 1 functions to store or transmit web pages and A/V files. A client (TV) 110 is connected to a home network. When the client (TV) 110 detects a device, for example, through UPnP using the home server 100, the client (TV) 110 can transmit, for example, an XHTML web page to the device. The client (TV) 110 may also be connected to an Internet gateway to communicate with an Internet server 120.

The Internet server 120 provides web pages. When a user selects specific A/V content on a web page, the client (TV) 110 performs operations for reproduction, storage, or the like of the A/V content. The client (TV) 110 may execute (or displays) a plurality of web pages and may reduce the number of web pages that can be executed (or displayed) simultaneously according to the user's need.

Another function of the client (TV) 110 is to support 3rd party notification using a scheme such as a) HTTP text notification, b) Polling-based notification for Internet, or c) Home multicast.

In scheme a), a specific notification is provided to the TV using, for example, an HTTP-protocol text message. In scheme b), the TV requests a specific web site at regular intervals to receive data. In scheme c), a managed network transmits data using a multicast channel to provide the specific notification to the TV.

Figure 2:
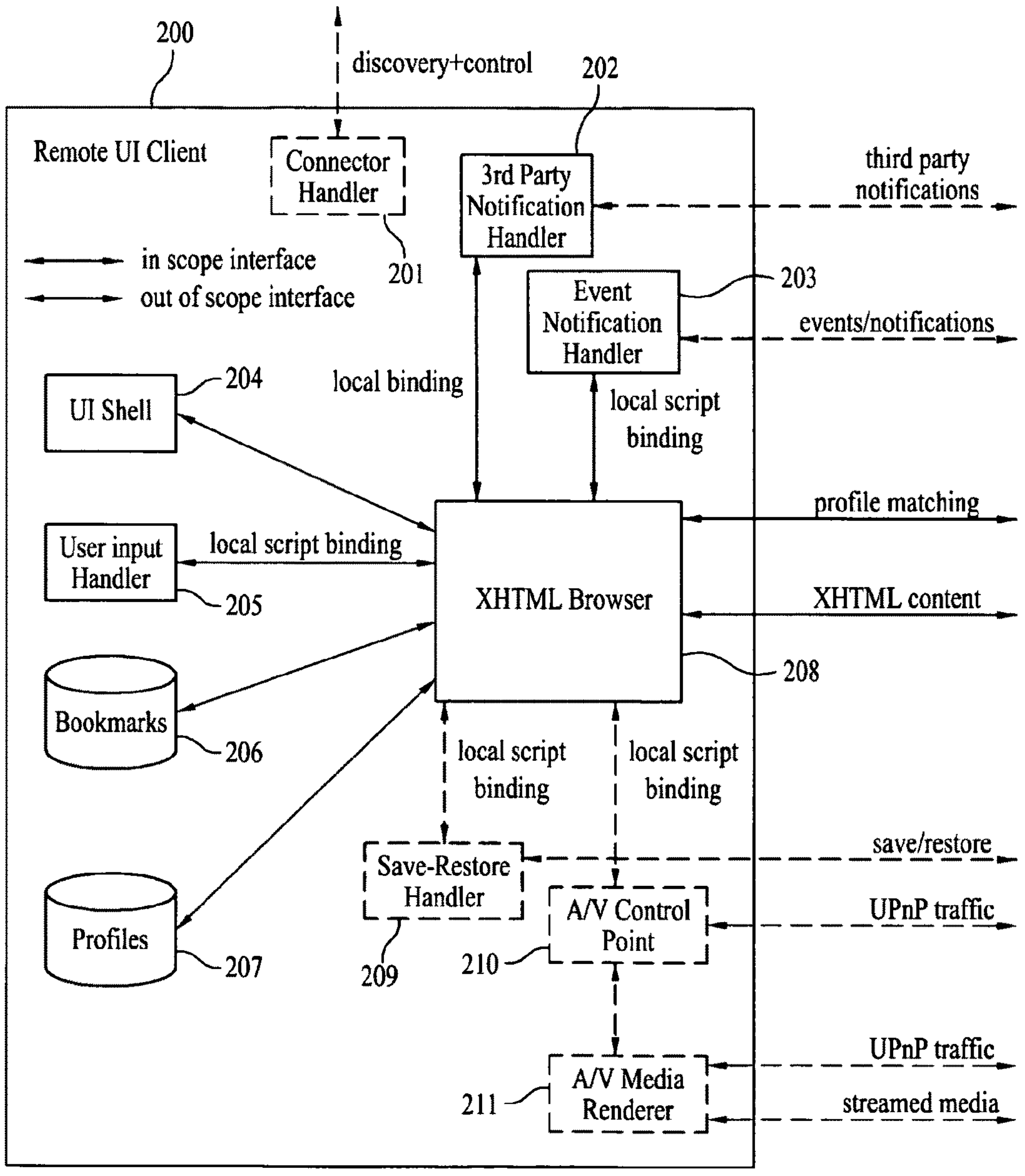
FIG. 2 illustrates the client shown in FIG. 1 in more detail.

FIG. 2 illustrates the client shown in FIG. 1 in more detail.

As shown in FIG. 2, the client 200 includes, for example, a connector handler 201, a 3$^{rd}$ party notification handler 202, an event notification handler 203, a UI shell 204, a user input handler 205, bookmarks 206, profiles 207, an XHTML browser 208, a save-restore handler 209, an A/V control point 210, and an A/V media renderer 211.

The client 200 shown in FIG. 2 can transmit and receive XHTML content and A/V data through the XHTML browser 208.

The XHTML browser 208 is also connected to the 3rd party notification handler 202 and the event notification handler 203. To allow an EAS message to be output through the XHTML browser 208, it is necessary to transfer an event associated with the EAS message to the 3rd party notification handler 202 or the event notification handler 203.

Figure 3:
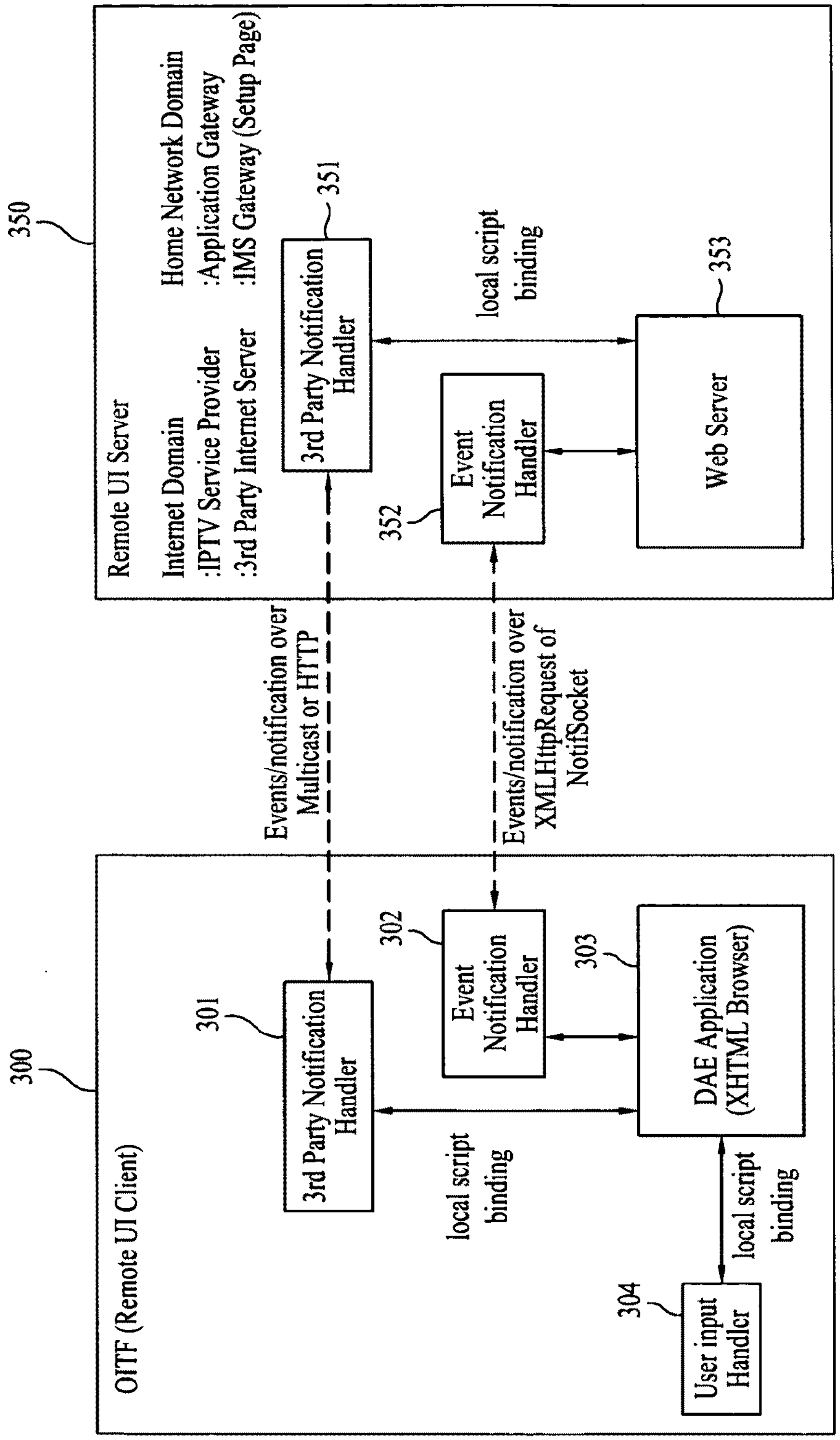
FIG. 3 illustrates a data transmission/reception process between a server and a client that can access the Internet.

FIG. 3 illustrates a data transmission/reception process between a server and a client that can access the Internet. Specifically, FIG. 3 illustrates data transmitted and received between the server and the 3rd party notification handler 202 and the event notification handler 203 in the client 200 shown in FIG. 2.

As shown in FIG. 3, the client 300 includes, for example, a 3rd party notification handler 301, an event notification handler 302, an XHTML browser 303, and a user input handler 304, and the server 350 includes, for example, a 3rd party notification handler 351, an event notification handler 352, and a web server 353.

Particularly, the event notification handler 302 processes or handles a notification transmitted through a script controlled by the server 350. The 3rd party notification handler 301 is designed to allow external events to be provided to the XHTML browser 303 even when the XHTML browser 303 is not running.

Figure 4:
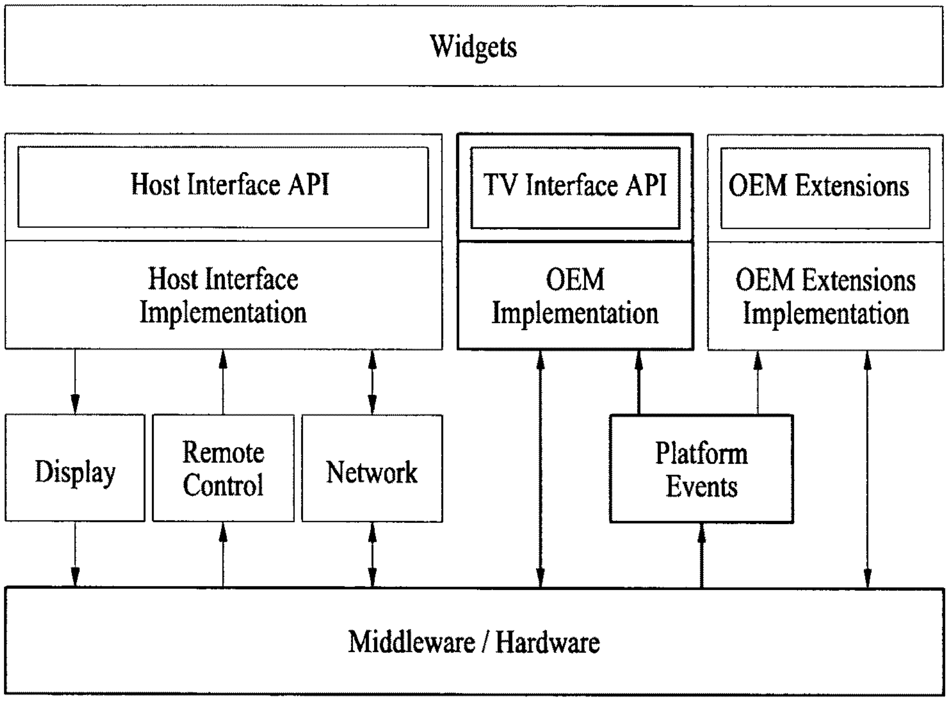
FIG. 4 illustrates an overall structure of an application that is installed according to an embodiment of the present invention.

FIG. 4 illustrates an overall structure of an application that is installed according to an embodiment of the present invention.

It is necessary to install a proper framework before executing a widget application since widget service providers provide different widget operating frameworks according to their service characteristics. For example, it is not possible to execute a widget provided by one provider if a widget of another provider is running. However, there is a need to use a standardized framework and widget application in an IPTV environment, unlike that described above.

The structure of FIG. 4 is designed to enable the widget application to perform TV-related functions. The widget application performs a specific function using a predefined object and performs TV middleware or hardware functions through an OEM implementation. The TV interface API allows the widget to perform a TV function, enabling control of lower APIs.

Figure 5:
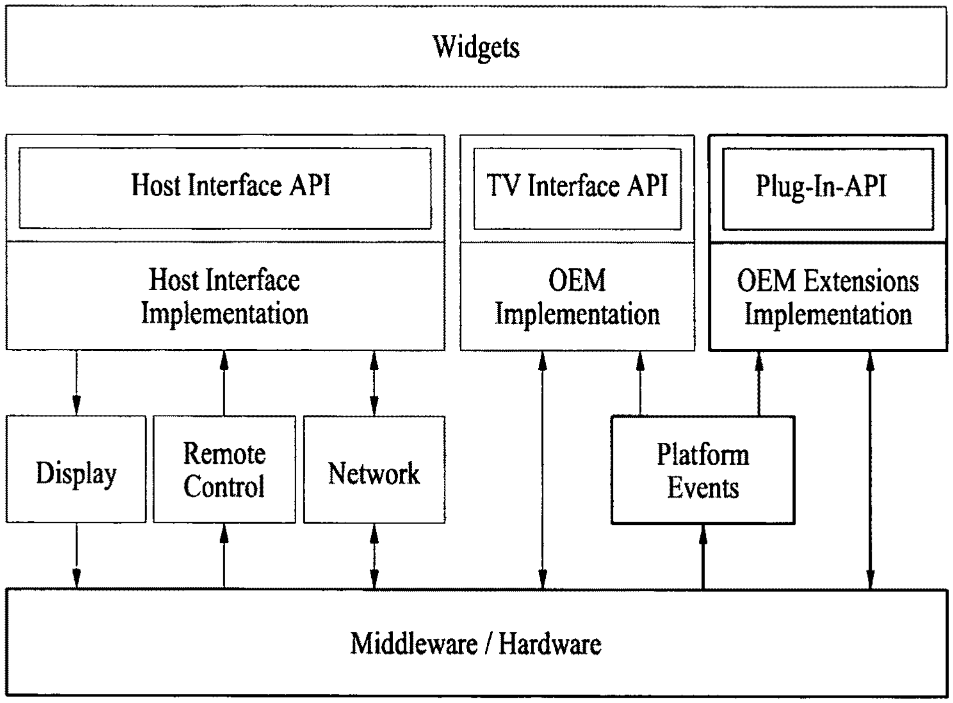
FIG. 5 illustrates an overall structure of an application installed according to another embodiment of the present invention.

FIG. 5 illustrates an overall structure of an application installed according to another embodiment of the present invention.

As shown in FIG. 5, an extensible TV widget framework may have a structure for accessing special hardware whose manufacturer is not defined. This structure can easily extend objects that can be used by a downloaded widget application.

FIG. 5 also illustrates a metadata schema of a user profile of the IPTV. For example, in the case of a PC, not only hardware but also OS have been standardized since the PC is a general device. However, in the case of the IPTV, hardware and OS environments of manufacturers are different. Accordingly, information of each manufacturer and preference information of the user may be stored and provided to the service provider to provide services customized to characteristics of the IPTV. This may be accomplished using the structure of FIG. 5.

On the other hand, widget applications need to use specific APIs provided by manufacturers. For example, in order to support the emergency alert function, a conventional receiver needs to include a receiving unit for receiving an emergency alert message, a converter for converting the message into text, and a display unit for displaying the text on a screen. However, the IPTV according to an embodiment of the present invention does not need such non-flexible hardware and software since, upon receiving a distributed widget application for the EAS, the IPTV only needs to execute the widget application.

First, in an embodiment of the present invention, an EAS widget application is designed using EAS objects which include OEM extension APIs and plug-in APIs. Operations of an EAS widget application performed when an EAS message is received over the Internet are defined in another embodiment of the present invention. In a further another embodiment of the present invention, the EAS widget application displays additional information when an EAS message is received through an Out Of Band (OOB) or an emergency alert table of an MPEG-2 TS. Another embodiment of the present invention suggests a more efficient method for allowing a specific event to be preferentially processed among a variety of events.

The following is a more detailed description of the embodiments of the present invention described above.

Figure 6:
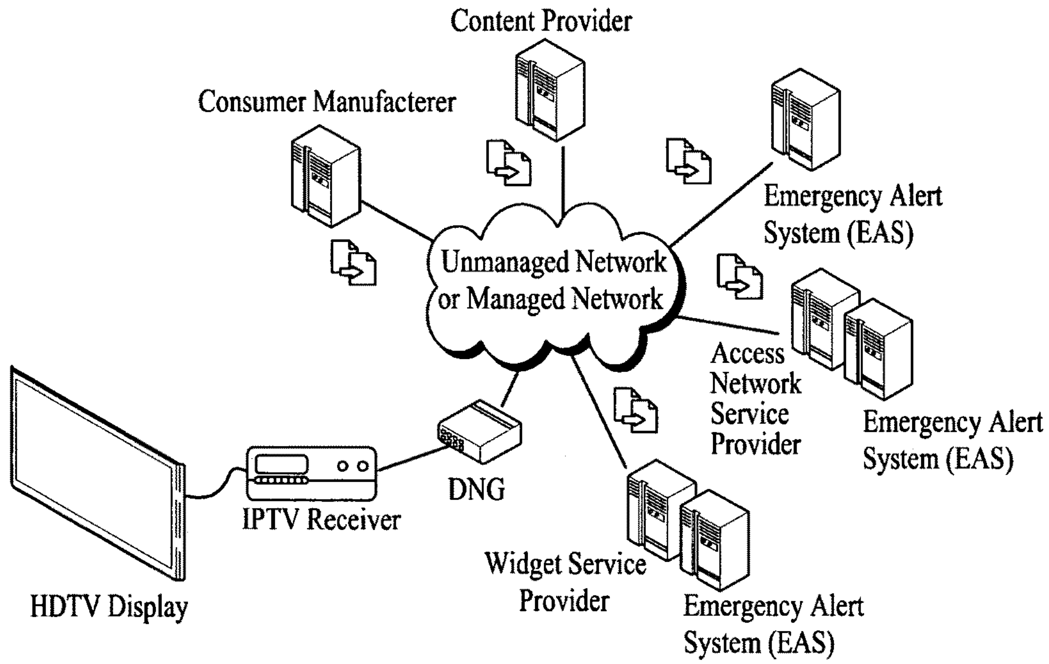
FIG. 6 illustrates entities that are connected through a network according to an embodiment of the present invention.

FIG. 6 illustrates entities that are connected through a network according to an embodiment of the present invention.

As shown in FIG. 6, the Emergency Alert System (EAS) is independently connected to the Internet to notify the general public of a national emergency, a natural disaster, or a regional emergency. In this case, the EAS is controlled by a national organization. On the other hand, an access network service provider may include functionality of the EAS.

A widget service provider may include the EAS or may process and transmit another EAS information. In this case, the widget service provider transmits appropriate data together with the widget service application.

Figure 7:
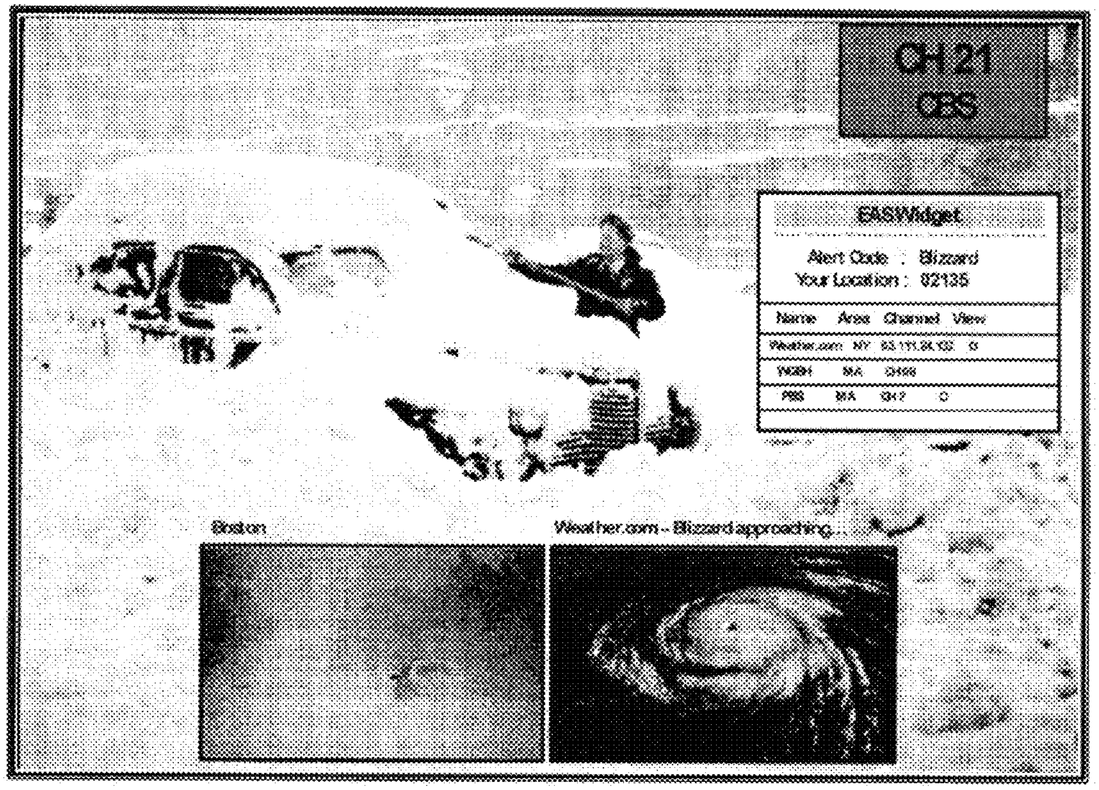
FIG. 7 illustrates a screen of an IPTV on which an EAS widget application is executed and displayed according to an embodiment of the present invention.

FIG. 7 illustrates a screen of an IPTV on which an EAS widget application is executed and displayed according to an embodiment of the present invention.

The user may view a broadcast of a specific channel on the IPTV. An EAS widget application is running while being displayed at a specific position on the screen as shown in FIG. 7. The EAS widget application may be designed such that a specific EAS message is transmitted according to the current position of the IPTV or the viewer.

In FIG. 7, a broadcast in which a person is cleaning snow in a severe snowstorm is shown and a moving image received from a specific web site is displayed on the screen at a lower portion thereof. Weather information of another region may also be received and displayed on the screen at another lower portion thereof. Since the EAS-related information is very important and relates to the public interest, for example, a national organization, a meteorological office, or an authorized broadcast system need to provide the EAS-related information.

The EAS widget application according to an embodiment of the present invention may receive EAS-related information using two methods. In the first method, the EAS widget application receives additional emergency alert information directly from the network. In the second method, the EAS widget application accesses the additional emergency alert information using a table included in a broadcast signal.

The first method will be described below with reference to FIGS. 8 and 9 and the second method will be described later with reference to FIGS. 10 to 13. The first method may be used by an IPTV and the second method may be used by an interactive (or bidirectional) cable TV. In the second method, additional information relating to the EAS is extracted from an MPEG-2 TS or Out Of Band (OOB).

Figure 8:
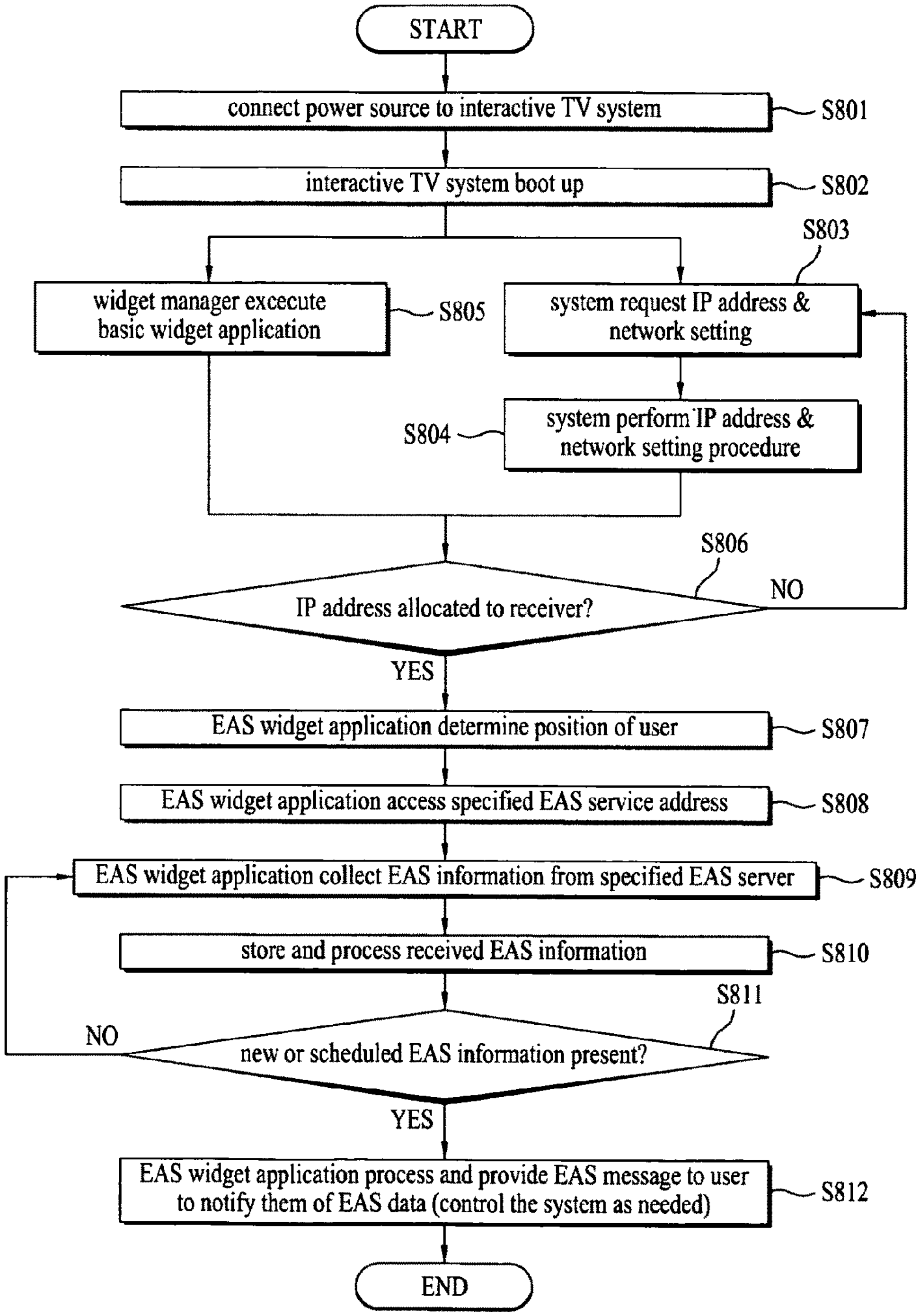
FIG. 8 is a flow chart illustrating a procedure in which an EAS widget application is executed according to an embodiment of the present invention.

FIG. 8 is a flow chart illustrating a procedure in which an EAS widget application is executed according to an embodiment of the present invention. Specifically, FIG. 8 is a flow chart illustrating how the EAS widget application operates to acquire an EAS message from a network according to a pull-mode scheme.

As shown in FIG. 8, a power source is connected to an interactive TV (for example, an IPTV) according to an embodiment of the present invention (S801). The interactive TV boots up (S802). The interactive TV requests IP address and network setting (S803) and performs a corresponding IP address and network setting procedure (S804). A widget manager of the interactive TV executes the EAS widget application (S805).

The EAS widget application determines whether or not an IP address has been allocated to the interactive TV (S806). When it is determined that an IP address has been allocated, the EAS widget application determines the position of the user of the interactive TV (S807).

The EAS widget application accesses a specified EAS service address (S808). The EAS widget application collects EAS data from a server that provides the specified EAS service (S809). The EAS widget application processes and stores the collected EAS data (S810).

The EAS widget application determines whether or not new data or scheduled EAS data is present in the EAS data (S811). If it is determined that new data or scheduled EAS data is present, the EAS widget application notifies the user of the EAS data using an EAS message (S812).

Figure 9:
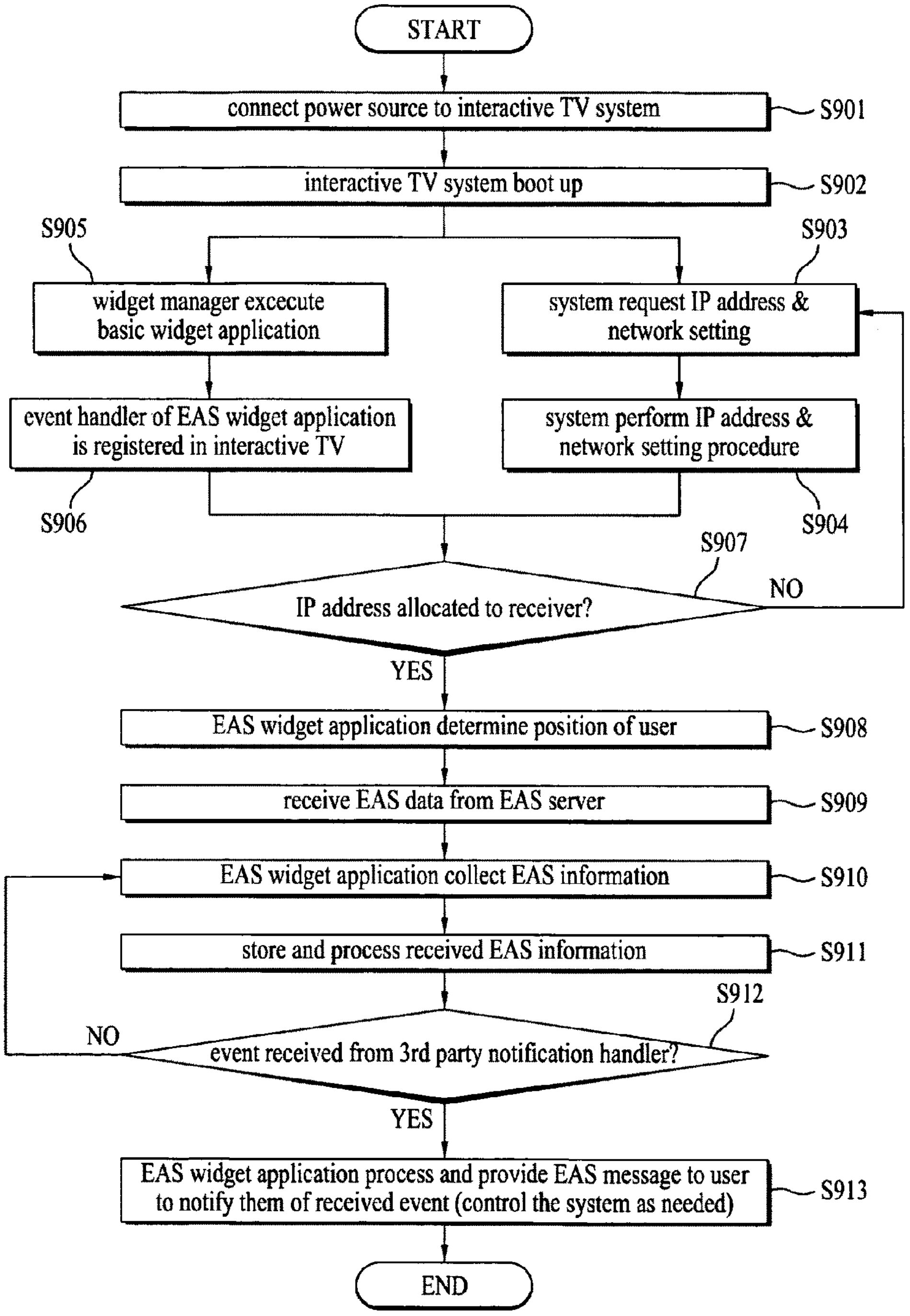
FIG. 9 is a flow chart illustrating a procedure in which an EAS widget application is executed according to another embodiment of the present invention.

FIG. 9 is a flow chart illustrating a procedure in which an EAS widget application is executed according to another embodiment of the present invention. Specifically, FIG. 9 is a flow chart illustrating how the EAS widget application operates to acquire an EAS message from a network according to a notification scheme.

As shown in FIG. 9, a power source is connected to an interactive TV (for example, the IPTV) according to an embodiment of the present invention (S901). The interactive TV boots up (S902). The interactive TV requests IP address and network setting (S903) and performs an IP address and network setting procedure (S904). A widget manager of the interactive TV executes the EAS widget application (S905) and an event handler of the EAS widget application is registered in the interactive TV (S906). Step S906 may further include, for example, the step of previously registering the interactive TV in an EAS-related server.

The EAS widget application determines whether or not an IP address has been allocated to the interactive TV (S907). When it is determined that an IP address has been allocated, the EAS widget application determines the position of the user of the interactive TV (S908).

The EAS widget application receives EAS data from the EAS-related server (S909). The EAS widget application collects EAS data from a server that provides a specified EAS service (S910). The EAS widget application processes and stores the collected EAS data (S911).

The EAS widget application determines whether or not an event has been received through a 3rd party notification handler (S912). If it is determined that an event has been received, the EAS widget application notifies the user of the event using an EAS message (S913).

The following is a summary of the embodiment of the present invention described above with reference to FIGS. 8 and 9.

The method of controlling an emergency alert system (EAS) widget application in an IPTV includes executing the EAS widget application, directly receiving additional emergency alert information from an EAS server connected to an Internet Protocol (IP) network, and performing control to display the additional emergency alert information on the EAS widget application.

Here, the receiving step includes identifying a region in which the IPTV is located and accessing an EAS server corresponding to the identified region.

The receiving step includes receiving the additional emergency alert information from an EAS server in which information identifying the region in which the IPTV is located has been previously registered.

The EAS widget application calls at least one EAS extension Application Programming Interface (API). The EAS extension API will be described in more detail with reference to FIG. 15.

According to another embodiment of the present invention, the EAS widget application is executed using a method of acquiring an address of an EAS-related server from an MPEG-2 TS. The server address acquisition method may be manually set or may be set through a remote control procedure and may also be set using a Dynamic Host Configuration Protocol (DHCP) method.

An emergency alert table may be designed to be changed as shown in FIGS. 10 to 13.

FIG. 10 illustrates an emergency alert table newly defined according to an embodiment of the present invention. FIG. 11 illustrates identification values of a descriptor tag added to the emergency alert table of FIG. 10.

The descriptor can be used to store URL addresses since a descriptor_length is 1024 bytes as shown in FIG. 10. However, the structure of descriptor_( ) is changed as shown in FIG. 11 in order to notify the TV of presence of a URL in the descriptor( ) that is inserted in an entry (A) in the emergency alert table shown in FIG. 10.

As shown in FIG. 11, descriptor tags are used to discriminate between descriptors. For example, when a descriptor tag has a value of 0x03, the descriptor tag identifies a URI descriptor. Detailed examples of the URI descriptor that is included in the emergency alert table of FIG. 10 are illustrated in FIGS. 12 and 13.

That is, FIG. 12 illustrates a detailed example of the URI_Descriptor that is added to the emergency alert table of FIG. 10.

FIG. 13 illustrates another example of the URI_Descriptor that is added to the emergency alert table of FIG. 10.

When the descriptor tag has a value of 0x03, the descriptor tag of FIG. 12 is also set to "0x03" as shown in FIG. 11. When the descriptor length is set to 8 bits, URI information of up to 256 bytes can be included in the descriptor.

The emergency alert table may also be designed such that a URI_Descriptor is located in entry (B) in FIG. 10. In this case, the URI_Descriptor is changed as shown in FIG. 13 according to an embodiment of the present invention.

When the structure of URI_Descriptor is designed as shown in FIG. 13, a plurality of URI descriptors may be included in the URI_Descriptor structure. In the case where URI_Descriptors are added individually in this manner, the size of each URI_Descriptor can be adjusted variably and thus it is possible to transmit a URI address containing an unlimited amount of additional information. For example, when a URI_Descriptor_length shown in FIG. 13 is set to 15 bits, the URI_Descriptor can be extended to 32 Kbytes. However, if a URI_Descriptor is located in an extensible descriptor( ) there is an advantage in that it is possible to extend the URI_Descriptor while minimizing modification of the existing transmitter and receiver.

The following is a summary of an embodiment of the present invention described above with reference to FIGS. 10 to 13.

An embodiment of the present invention defines a method of controlling data for an emergency alert system (EAS) in a digital broadcast receiver able to receive cable broadcast data.

The method includes steps of receiving a digital broadcast signal including an emergency alert table including a uniform resource identifier (URI) descriptor, detecting a URI address included in the URI descriptor, accessing the URI address, receiving additional emergency alert information from the URI address and performing control to display the additional emergency alert information on a screen of the digital broadcast receiver.

The method further includes executing an EAS widget application. Moreover, the controlling step includes performing control to display the additional emergency alert information on the EAS widget application using the URI address.

The EAS widget application calls at least one EAS extension Application Programming Interface (API).

The EAS extension API includes at least one of a first API used to determine a region in which the IPTV is located using an IP address of the IPTV, a second API used to allow the EAS widget application to be displayed in a layer above other widget applications, a third API used to most preferentially perform access to an EAS server, a fourth API used to forcibly tune to an EAS channel, and a fifth API used to limit partial functionality of the IPTV during execution of the EAS widget application.

The EAS widget application calls at least one EAS extension Application Programming Interface (API). The EAS extension API will be described in more detail with reference to FIG. 15.

Figure 14:
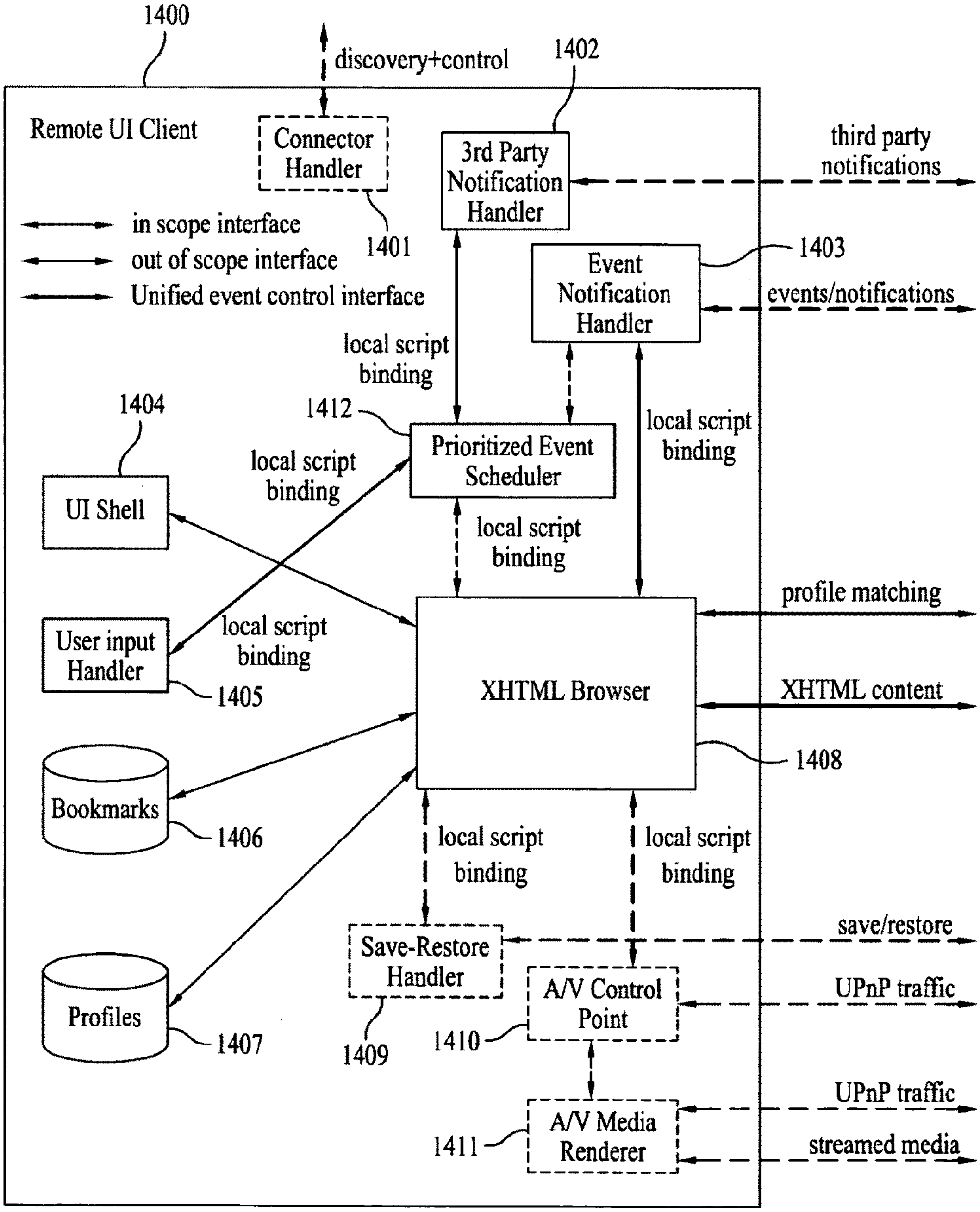
FIG. 14 is a block diagram illustrating components of a broadcast receiver that preferentially processes a specific event according to another embodiment of the present invention.

FIG. 14 is a block diagram illustrating components of a broadcast receiver that preferentially processes a specific event according to another embodiment of the present invention.

FIG. 14 shows an interactive TV (for example, an IPTV) according to an embodiment of the present invention in more detail.

As shown in FIG. 14, an interactive TV 1400 includes, for example, a connector handler 1401, a 3rd party notification handler 1402, an event notification handler 1403, a UI shell 1404, a user input handler 1405, a bookmarks 1406, profiles 1407, an XHTML browser 1408, a save-restore handler 1409, an A/V control point 1410, an A/V media renderer 1411, and a prioritized event scheduler 1412. This embodiment may also be complementarily construed with reference to FIG. 2 if needed.

A browser is used to render and control a user interface delivered by a server. For example, the browser corresponds to the XHTML browser 1408.

A first handler is used to forward a first event to the browser for processing. For example, the first handler corresponds to the user input handler 1405.

A second handler is used to send and receive a second event during active interaction via server-supplied scripts. For example, the second handler corresponds to the event notification handler 1403.

A third handler is used to process a third event and invoke the browser to fetch and render UI content using a URL contained within the third event. For example, the third handler corresponds to the 3rd party notification handler 1402.

The prioritized event scheduler 1412 connects the event notification handler, the user input handler, the third party notification handler, and the browser, wherein the prioritized event scheduler further reorders sequences based on priorities which the first event, second event and third event is to be transmitted to the browser.

For example, the browser corresponds to the XHTML browser 1408.

The prioritized event scheduler 1412 cancels (or discards) or delays (or postpones) some events according to the priorities. The prioritized event scheduler 1412 assigns highest priority to an event associated with emergency alert information.

The prioritized event scheduler 1412 newly suggested in the present invention is connected to all of the user input handler 1405, the event notification handler 1403, and the 3rd party notification handler 1402. The prioritized event scheduler 1412 is designed to be responsible for and process all notifications or events received through a remote UI client or the interactive TV 1400.

In the case where the prioritized event scheduler 1412 is added to the client TV as shown in FIG. 14, notifications or events received from a number of handlers may be reordered according to priorities and may be canceled or delayed as needed, thereby overcoming the problem that delivery of the most important message such as an EAS message is delayed or the most important message is not received.

In the case where the prioritized event scheduler 1412 is added to the client TV as shown in FIG. 14, there is an advantage in that it is possible to reduce the number of event handlers to be managed by the XHTML browser 1408 from a plurality of event handlers (for example, 1402, 1403, and 1405) to one event handler (for example, 1402). Accordingly, it is possible to control all handlers using a unified function.

FIG. 15 illustrates a definition of an EAS extension Application Programming Interface (API) used in a procedure for executing an EAS widget application according to an embodiment of the present invention.

To normally run the EAS widget application described above, there is a need to define object APIs to be used by the EAS widget application. These object APIs may be named "EAS extension APIs".

A plurality of EAS extension APIs may be defined as shown in FIG. 15. For example, a first API used to determine a region in which the IPTV is located using an IP address of the IPTV is named, for example, "GetHostIpAddress".

In addition, a second API used to allow the EAS widget application to be displayed in a layer above other widget applications is named, for example, "DisplayEASWidgetOnTop".

Further, a third API used to most preferentially perform access to an EAS server is named, for example, "ConnectEASServer".

Furthermore, a fourth API used to forcibly tune to an EAS channel is named, for example, "ChangeEASChannel". In addition, a fifth API used to limit partial functionality of the IPTV during execution of the EAS widget application is named, for example, "SetHostControlPolicy".

Figure 16:
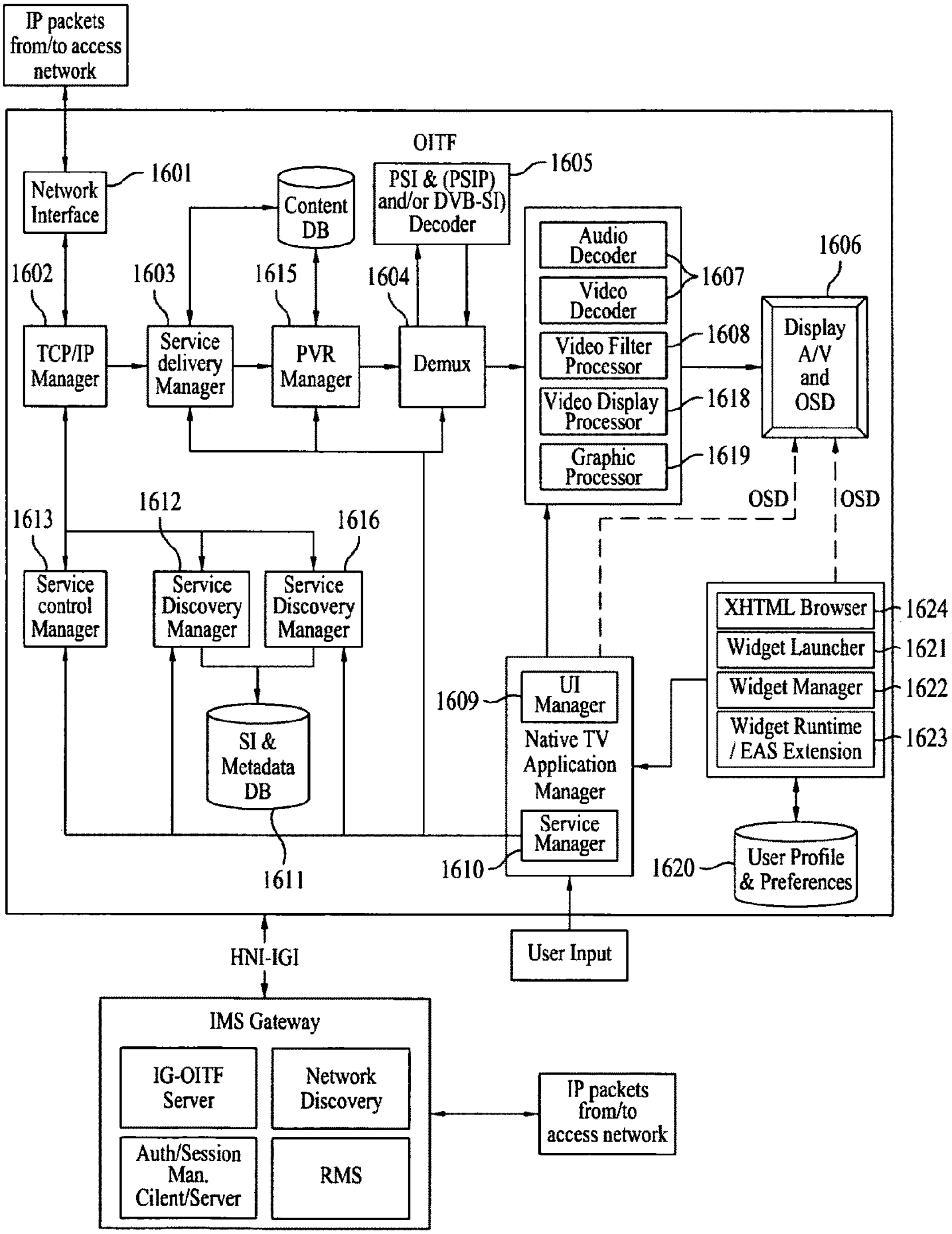
FIG. 16 is a block diagram illustrating an IPTV according to an embodiment of the present invention.

FIG. 16 is a block diagram illustrating an IPTV according to an embodiment of the present invention.

A network interface 1601 is responsible for functions associated with receiving/sending IPTV packets and physical & data link layers.

A TCP/IP manager 1602 is responsible for functions associated with end to end (source to destination) packet delivery and classifying packets into appropriate protocol managers.

A service delivery manager 1603 is responsible for functions associated with handling real-time streaming data and downloading content and also responsible for functions associated with retrieving content from a content DB for later consuming.

A demultiplexer 1604 is responsible for functions associated with de-multiplexing audio, video and PSI tables from input transport packets and controlling the de-multiplexing for PSI tables by a PSI Decoder and making the sections of PSI tables and sending the same to the PSI Decoder and controlling the de-multiplexing for A/V transport packets.

A PSI & (PSIP and/or DVB-SI) decoder 1605 is responsible for functions associated with setting PIDs for PSI tables and PSIP/DVB-SI tables to the demultiplexer and decoding the private sections of PSI and (PSIP and/or DVB-SI) sent by the demultiplexer. The decoding result is used to de-multiplex input transport packets (e.g., set Audio and Video PID to the demultiplexer). The decoder 1605 also functions as an audio and video decoder for decoding audio and video elementary stream packets.

An A/V and OSD displayer 1606 is responsible for functions associated with receiving audio and video data from A/V Decoder, controlling video and audio data, displaying the video data on a screen, outputting the audio data through a speaker, and controlling On Screen Display (OSD) Graphic data.

An audio and video decoder 1607 is responsible for functions associated with decoding audio and video elementary stream packets.

A video filter processor 1608 is responsible for functions associated with processing the video filter in all areas of user selections or an entire video screen. The video filter processor 1608 may access the video frame buffer memory to manipulate or adjust video or still pictures.

A User Interface (UI) manager 1609 is responsible for functions associated with supporting the Graphical User Interface on a TV Screen and receiving a user key through a remote control or front panel and managing the states of the entire TV system.

A Service manager 1610 is responsible for functions associated with controlling all other managers relating to the services such as service control manager, service delivery manager, IG-OITF client, service discovery manager, and metadata manager services and is also responsible for supporting or providing IPTV services.

An SI & metadata DB 1611 is a database of service discovery information and metadata relating to the services.

A service discovery (SD) manager 1612 is responsible for functions associated with enabling the discovery of IPTV services over a bi-directional IP network and providing all information for selecting services.

A service control manager 1613 is responsible for functions associated with selecting and controlling services and managing sessions, selecting live broadcasting services using an IGMP or RTSP protocol, and selecting VOD content using an RTSP protocol. If IMS is used, the service control manager 1613 may use an SIP protocol for initiating and managing sessions through an IMS Gateway. The service control manager 1613 may also use the RTSP protocol to control delivery of TV broadcasts, audio, and on-demand data. The RTSP protocol uses persistent TCP connection and allows trick mode control of real-time media streaming.

A Content DB 1614 is a database of content which may be delivered by a content download system or may be recorded by a live media TV.

A PVR manager 1615 is responsible for functions associated with recording and playing back live streaming content and gathering all necessary metadata of the recorded content and generating additional information for better user experience (e.g. thumbnail image, index etc).

A metadata manager 1616 is responsible for functions associated with handling metadata such as TV Anytime, BCG and ECG related to a service.

A video display processor 1618 processes video display information and a graphic processor 1619 processes graphic information.

The system may maintain user information, all information associated with widgets (installed widgets and active/inactive widgets), preferences, and the ITF receiver's hardware compatibility and standard profile. User Profile data stored in a user profile & preferences storage 1620 may be read from a widget launcher 1621, a widget manager 1622, and a web browser 1624 when the user logs into the system or deletes downloaded widget applications.

A widget launcher 1621 executes an installed widget when the user logs into the system and executes the activated widget when the user changes the downloaded widget application.

A widget manager 1622 displays all widget applications which can be installed and executed in the ITF, requests downloading of a widget application that the user has selected from servers, activates/inactivates the downloaded widget, deletes the downloaded or running widget and controls the running widget and changes the location of the widget on the screen.

The Widget application calls a predefined module or control interface in the ITF. The EAS Extension is one of a number of manufacturer extensions. The EAS Extension operates with Widget Runtime middleware 1623. The EAS Widget application calls the predefined EAS Extension APIs.

A web browser (Declarative Application Environment) 1624 may render HTML pages on the screen and parse documents according to the W3C specification.

The Real-Time Transport Protocol/RTP Control Protocol (RTP/RTCP) may be used with MPEG-2 TSs. MPEG-2 packets are encapsulated in an RTP. RTP packets may be parsed and the parsed transport packets may be sent to the demultiplexer. Moreover, feedback on the network reception quality is sent using the RTCP. MPEG-2 transport packets may be carried directly in a UDP without an RTP. For content downloading, the HTTP or FLUTE protocol may be used for delivery.

Although the embodiments of the present invention have been individually described with reference to FIGS. 1 to 16, the features of the embodiments shown in FIGS. 1 to 16 may be combined as needed to implement other embodiments.

The embodiments of the present invention described above suggest architectures required to implement emergency alert in an interactive TV or IPTV so that smooth transmission of emergency messages is achieved using a unified notification method. The embodiments of the present invention also suggest a method for managing event handlers and a method for receiving a variety of emergency alert messages, which are required when an emergency alert widget application is implemented using a widget, thereby enabling efficient receiver operations. The embodiments of the present invention also suggest how a widget application provides additional service information regarding an emergency to the user when an emergency alert message is received through an OOB or in-band, so that the widget application can operate not only in an interactive TV but also in a one-way cable DTV receiver even when the widget application is embedded in the TV receiver. Of course, the widget application is designed to be free from compatibility problems since the bidirectional cable DTV receiver supports bidirectionality.

Each of the methods according to the present invention may be implemented in the form of program commands that are executable by a variety of computer means and may then be recorded on a computer-readable medium. The computer-readable medium may include program commands, data files, data structures, and the like individually or in combination. The program commands recorded on the medium may be specially designed and configured for the present invention or may be known and available to those skilled in computer software. Examples of the computer-readable recording medium include magnetic media such as a hard disk, a floppy disk, and a magnetic tape, optical media such as a CD-ROM and a DVD, magneto-optical media such as a floptical disk, and hardware devices specially configured to store and execute program commands such as a ROM, a RAM, and a flash memory. Examples of the program commands include not only machine language code such as that produced by a compiler but also high-level language code that may be executed by a computer using an interpreter or the like. The hardware devices described above may be configured to operate as one or more software modules to perform the operations of the present invention, and vice versa. Although the present invention has been described in conjunction with the limited embodiments and drawings, the present invention is not limited to the embodiments. Those skilled in the art will appreciate that various modifications, additions and substitutions are possible from this description. Therefore, the scope of the present invention should not be limited to the description of the exemplary embodiments and should be determined by the appended claims and their equivalents.

What is claimed is:

1. A method of controlling data for an emergency alert system (EAS) in a digital broadcast receiver, the method comprising:

downloading and installing an EAS widget application without regard for a system of the digital broadcast receiver, wherein the EAS widget application calls EAS extension Application Programming Interface (API), wherein the EAS extension API includes a first API used to limit partial functionality of the IPTV during execution of the EAS widget application, a second API used to determine a region in which the IPTV is located using an IP address of the IPTV, and a third API used to allow the EAS widget application to be displayed in a layer above other widget applications, and;

receiving a digital broadcast signal including an emergency alert table including a uniform resource identifier (URI) descriptor;

detecting a URI address included in the URI descriptor;

accessing the URI address;

receiving additional emergency alert information from the URI address; and controlling to display the additional emergency alert information on a screen of the digital broadcast receiver.

2. The method according to claim 1, wherein the method further includes executing the EAS widget application.

3. The method according to claim 2, wherein the controlling step includes performing control to display the additional emergency alert information on the EAS widget application using the URI address.

4. The method according to claim 2, wherein the EAS extension API further includes a fourth API used to most preferentially perform access to an EAS server, and a fifth API used to forcibly tune to an EAS channel.

5. A method of controlling an emergency alert system (EAS) widget application in an IPTV, the method comprising:

downloading and installing the EAS widget application without regard for a system of the IPTV, wherein the EAS widget application calls EAS extension Application Programming Interface (API), wherein the EAS extension API includes a first API used to limit partial functionality of the IPTV during execution of the EAS widget application, a second API used to determine a region in which the IPTV is located using an IP address of the IPTV, and a third API used to allow the EAS widget application to be displayed in a layer above other widget applications;

executing the EAS widget application;

directly receiving additional emergency alert information from an EAS server connected to an Internet protocol (IP) network; and performing control to display the additional emergency alert information on the EAS widget application.

6. The method according to claim 5, wherein the receiving step includes:

identifying a region in which the IPTV is located; and accessing an EAS server corresponding to the identified region.

7. The method according to claim 5, wherein the receiving step includes receiving the additional emergency alert information from an EAS server in which information identifying a region in which the IPTV is located has been previously registered.

8. The method according to claim 5, wherein the EAS extension API further includes a fourth API used to most preferentially perform access to an EAS server, and a fifth API used to forcibly tune to an EAS channel.

9. A digital broadcast receiver for controlling data for an emergency alert system (EAS), the digital broadcast receiver comprising:

a network interface module configured to download an EAS widget application without regard for a system of the digital broadcast receiver, wherein the EAS widget application calls EAS extension Application Programming Interface (API), wherein the EAS extension API includes a first API used to limit partial functionality of the IPTV during execution of the EAS widget application, a second API used to determine a region in which the IPTV is located using an IP address of the IPTV, and a third API used to allow the EAS widget application to be displayed in a layer above other widget applications;

a widget managing module configured to install the downloaded EAS widget application into the IPTV;

a tuner configured to receive digital broadcast signal including an emergency alert table including a uniform resource identifier (URI) descriptor;

a detecting module configured to detect a URI address included in the URI descriptor;

an accessing module configured to access the URI address;

a receiving module configured to receive additional emergency alert information from the URI address; and a controlling module configured to perform control to display the additional emergency alert information on a screen of the digital broadcast receiver.

10. An Internet protocol television (IPTV) for controlling an emergency alert system (EAS) widget application, the IPTV comprising:

a network interface module configured to download the EAS widget application without regard for a system of the digital broadcast receiver, wherein the EAS widget application calls EAS extension Application Programming Interface (API), wherein the EAS extension API includes a first API used to limit partial functionality of the IPTV during execution of the EAS widget application, a second API used to determine a region in which the IPTV is located using an IP address of the IPTV, and a third API used to allow the EAS widget application to be displayed in a layer above other widget applications;

a widget managing module configured to install the downloaded EAS widget application into the IPTV;

an executing module configured to execute the EAS widget application;

a receiving module configured to receive directly additional emergency alert information from an EAS server connected to an Internet Protocol (IP) network; and a controlling module configured to perform control to display the additional emergency alert information on the EAS widget application.

* * * * *